(12) United States Patent
Maurer et al.

(10) Patent No.: US 6,650,773 B1
(45) Date of Patent: Nov. 18, 2003

(54) METHOD INCLUDING LOSSLESS COMPRESSION OF LUMINANCE CHANNEL AND LOSSY COMPRESSION OF CHROMINANCE CHANNELS

(75) Inventors: Ron P. Maurer, Haifa (IL); Danny Barash, Haifa (IL); Richard Alan Burgin, Meridian, ID (US); David E. Thedens, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 293 days.

(21) Appl. No.: 09/676,867

(22) Filed: Sep. 29, 2000

(51) Int. Cl.[7] .................................. G06K 9/36
(52) U.S. Cl. .................. 382/166; 382/167; 358/520
(58) Field of Search ................. 352/162, 164, 352/165, 166, 167, 232, 239; 358/532, 534, 536, 501, 515, 516, 518, 520; 348/384.1; 375/240.01; 708/203

(56) References Cited

U.S. PATENT DOCUMENTS

| | | |
|---|---|---|
| 5,247,589 A | 9/1993 | Faul |
| 5,359,438 A | 10/1994 | Maeda |
| 5,539,842 A | 7/1996 | Schwartz |
| 5,748,242 A * | 5/1998 | Podilchuk ................ 348/391.1 |
| 6,067,120 A * | 5/2000 | Horikawa et al. .......... 348/447 |
| 6,256,347 B1 * | 7/2001 | Yu et al. ................ 375/240.13 |
| 6,314,136 B1 * | 11/2001 | Kilgariff ..................... 375/240 |
| 6,360,022 B1 * | 3/2002 | Lubin et al. ................ 382/260 |

FOREIGN PATENT DOCUMENTS

| | | |
|---|---|---|
| EP | 1006715 A2 | 6/2000 |
| WO | WO 97/33425 | 9/1997 |

OTHER PUBLICATIONS

Steven Van Assche, et al.; "Evaluation of Lossless Compression Techniques for High–Resolution RGB and CMYK Color Images"; Oct., 1999; Journal of Electronic Imaging vol. 8(4); pp. 415–421.

* cited by examiner

Primary Examiner—Bhavesh M. Mehta
Assistant Examiner—Ali Bayat

(57) ABSTRACT

Compression of a digital image is performed by bit-depth truncating a luminance channel of the digital image and performing lossless compression on the bit-depth truncated luminance channel; and performing lossy compression on chrominance channels of the digital image.

27 Claims, 3 Drawing Sheets

METHOD INCLUDING LOSSLESS COMPRESSION OF LUMINANCE CHANNEL AND LOSSY COMPRESSION OF CHROMINANCE CHANNELS

BACKGROUND OF THE INVENTION

The present invention relates to digital images. More specifically, the present invention relates to compression of color document images.

Compound color documents may contain text, drawings and photo regions (sometimes overlaid), complex backgrounds (e.g., text boxes), watermarks and gradients. For example, magazines, journals and textbooks usually contain two or more of these features.

A page of a magazine may be captured by an image capture device (e.g., a scanner) and the resulting digital image of the page may be stored on a computer hard drive as an electronic file. The electronic file can be rather large. This makes it desirable to compress the digital image into a smaller file that takes less space to store.

Compression standards such as JPEG are suitable for compressing photo regions of the compound color documents. However, compression standards such as JPEG are usually not suitable for compressing text regions.

Compression standards such as CCITT, G4 and JBIG are suitable for compressing black and white text regions of the compound color documents. However, compression standards such as CCITT, G4 and JBIG are usually not suitable for compressing the photo regions.

SUMMARY OF THE INVENTION

According to one aspect of the present invention, compression of a digital image is performed by truncating bit depth of a luminance channel of the digital image and performing lossless compression on the truncated luminance channel; and performing lossy compression on chrominance channels of the digital image.

Other aspects and advantages of the present invention will become apparent from the following detailed description, taken in conjunction with the accompanying drawings, illustrating by way of example the principles of the present invention.

DETAILED DESCRIPTION OF THE INVENTION

Figure 1:
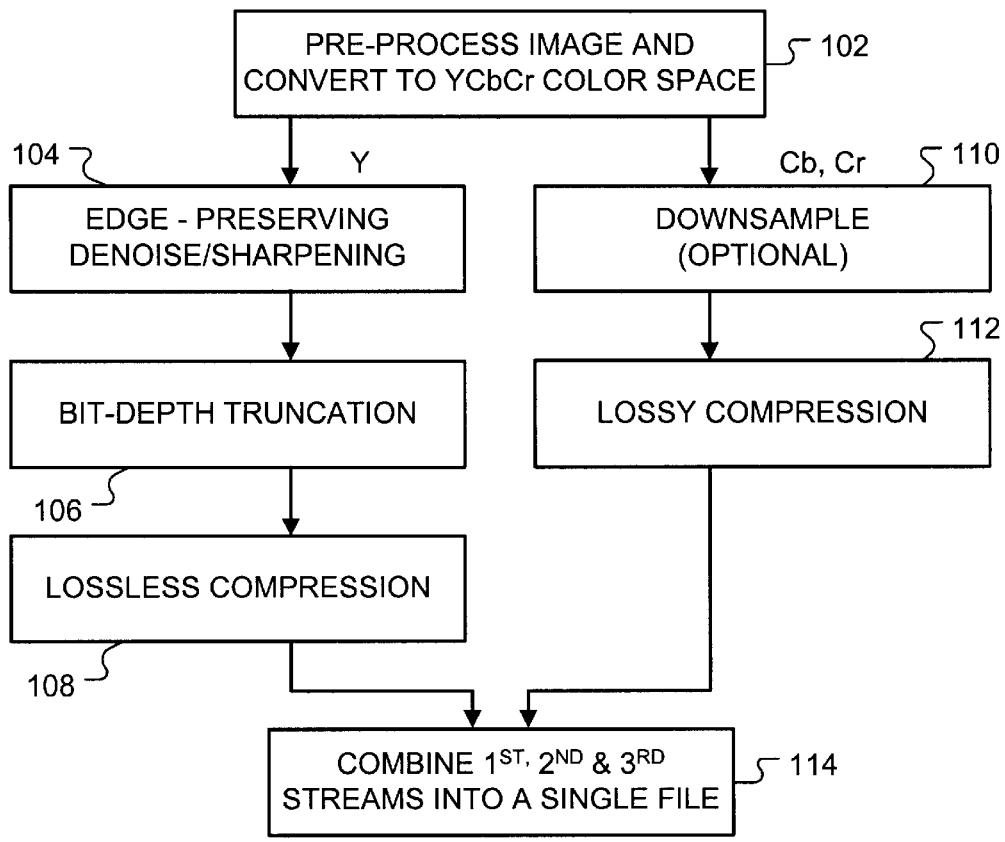
FIG. 1 is an illustration of a method of compressing a digital image in accordance with the present invention.

As shown in the drawings for purposes of illustration, the present invention is embodied in a method and apparatus for compressing digital images. Robust lossy compression of simple and compound document images is performed without generating noticeable irrecoverable distortions. In particular, good compression of compound color documents is achieved with high compression ratios and without noticeable artifacts in the text and non-text regions. Moreover, the compression is performed without analyzing images based on hard classifications (e.g., identifying text/non-text or background/features and using different algorithms to process the different features).

Standard lossy and lossless compression engines may be used. Use of standard compression engines allows the compression to be improved as new lossy and lossless compression standards emerge.

Reference is made to FIG. 1, which illustrates the method of compressing a digital image. The digital image is made up of a plurality of pixels, each pixel being represented by an n-bit word. In a typical 24-bit word representing RGB color space, for instance, eight bits represent a red component, eight bits represent a green component and eight bits represent a blue component.

The digital image is pre-processed and converted into YCbCr color space (block 102). The pre-processing is performed to remove features that take many bits to code but are irrelevant to the perceived visual quality of the image. These features include random noise (e.g., Gaussian noise, "salt and pepper" noise), dither patterns (common in documents scanned from newspapers, journals, etc.), "bleed-through" artifacts, off-white background color, etc. The pre-processing may be performed on the image in RGB color space or YCbCr color space. For example, deskewing may be performed on the digital image in RGB color space, and bleed-through removal may be performed on the digital image in YCbCr space. The bleed-through removal may also change light colors to pure white, thereby eliminating background noise. Although optional, pre-processing is preferred.

The luminance channel (Y) is processed separately from the chrominance channels (Cb and Cr). Edge-preserving denoise and sharpening may be applied to the luminance channel (block 104). Standard denoise and sharpening techniques may be used. However, a preferred denoise and sharpening technique is disclosed in assignee's U.S. Ser. No. 09/675,270 filed Sep. 29, 2000, which is incorporated herein by reference. The preferred technique provides denoising and sharpening while improving compressibility of the digital image. The sharpening may be performed by variable contrast stretching, which is disclosed in assignee's U.S. Ser. No. 09/676,011 filed Sep. 29, 2000 and also incorporated hereinby reference.

The luminance channel is bit-depth truncated (block 106). Bit-depth of the luminance channel is reduced to discard visually unimportant information to a level where visual artifacts are virtually unnoticeable (e.g., small contouring artifacts might be barely noticeable). In general, the bit depth of the luminance channel may be truncated to between five bits and seven bits. For example, an 8-bit luminance channel may be truncated to five bits.

Lossless compression is performed on the truncated luminance channel (block 108). Use of the lossless compression preserves spatial resolution and avoids any distortion in the location of sharp edges. A lossless compression standard such as JBIG, CCIT or G4 may be used. Resulting from the lossless compression is a first compressed data stream.

The chrominance channels may be downsampled (block 110). The downsampling reduces spatial resolution of the chrominance channels, but not bit depth. Each chrominance channels may be downsampled by a factor of two. Downsampling by a factor of two may be performed by replacing a 2×2 block of pixels with a single pixel representing the median or the average of the four pixels in the 2×2 block. Although optional, downsampling is preferred. However, the downsampling can cause chromatic bleed artifacts at sharp edges in the reconstructed image (the chromatic bleeding artifacts are reduced following reconstruction of the chrominance channels).

Lossy compression is performed on the chrominance channels (block 112). A lossy compression standard such as JPEG or JPEG-2000 may be used. This type of compression retains the accuracy of the color information to the full dynamic range in flat areas. A quality setting for the lossy compression is low enough to provide high compression without introducing visible artifacts into the reconstructed digital image. Resulting from the lossy compression is a second compressed data stream for the Cb chrominance channel and a third compressed data stream for the Cr chrominance channel.

The first, second and third streams are combined into a single file (block 114). Other data extracted from a scanned document (such as OCR) may be added to the file. The streams and additional data may be stored in a custom file-format. For instance, the three streams and the additional data may be stored within a compound file implementation such as Microsoft Structured Storage ("MSS"). Compound files may contain a file system-type structure within a single file. In the MSS language folders are called "Storages" and files within the Storage are called "Streams." Compound files may contain a file system-type structure within a single file. The file format may have a root level stream called a "Hub" and a series of root level storages for each page. The Hub stream may contain extended markup language ("XML") data giving instructions for rebuilding the digital image in a compatible viewer. Each page Storage may contain a "Map" Stream of XML data describing the textual content and layout of the page, as well as information about non-text page elements. The page Storage may optionally contain binary streams of non-text data. The three streams containing the compressed luminance and chrominance information may be contained in an image Storage, along with a thumbnail of the digital image.

Figure 2:
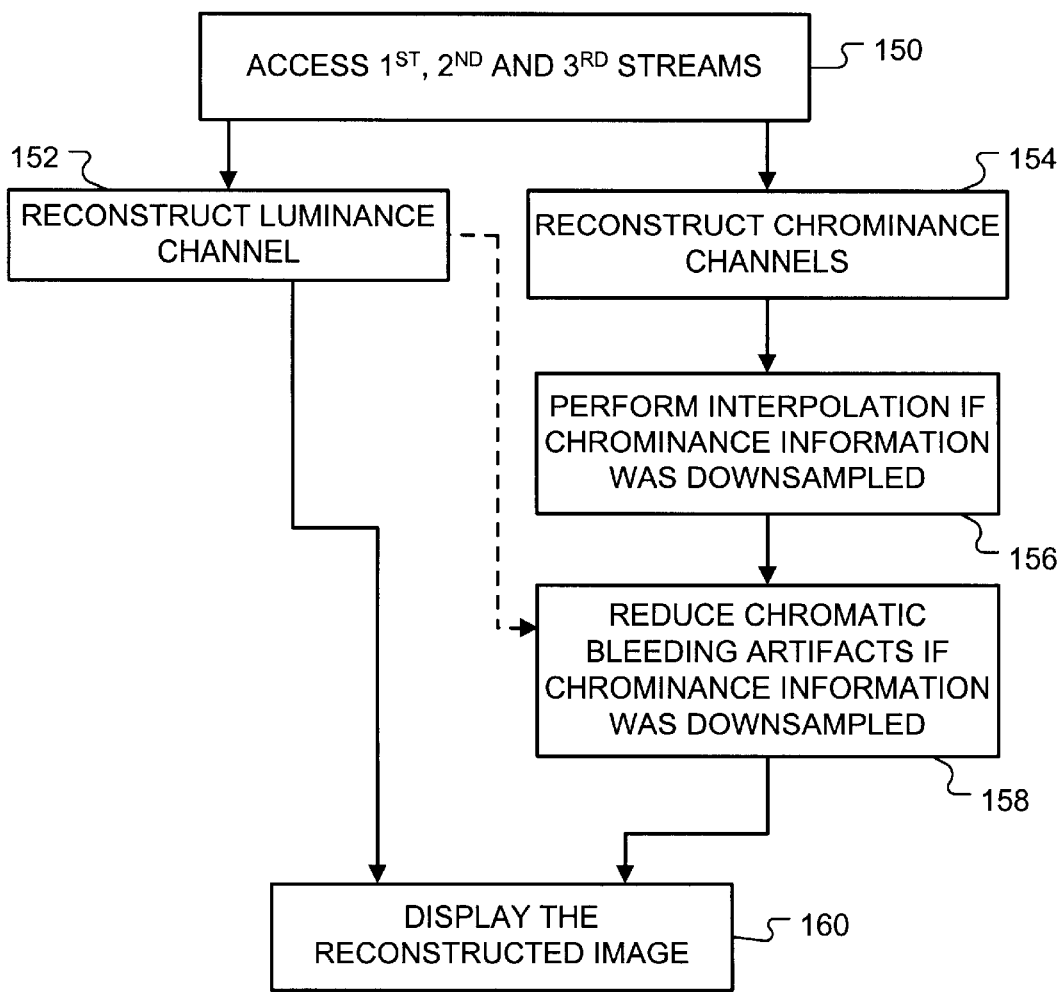
FIG. 2 is an illustration of a method of reconstructing the digital image in accordance with the present invention.

FIG. 2 illustrates a method of reconstructing the digital image from the compressed luminance and chrominance information in the file. The first and second data streams are extracted from the file (block 150), the luminance channel is reconstructed from the first stream (block 152), and the chrominance channels are reconstructed from the second and third streams (block 154). The luminance channel is reconstructed according to the same lossless standard and the chrominance channels are reconstructed according to the same lossy standard.

The reconstructed chrominance channels are interpolated to their original resolution if the chrominance channels were downsampled during compression (block 156). The interpolation may be performed by pixel replication.

Chromatic bleeding artifacts reduction is also performed on the full-resolution chrominance channels if the chrominance channels were downsampled prior to lossy compression (block 158). A preferred chromatic bleeding artifact reduction technique is disclosed in assignee's U.S. Ser. No. 09/676,866 filed Sep. 29, 2000 and incorporated herein by reference. In the preferred chromatic bleeding artifact reduction technique, chrominance information of at least some pixels in the digital image is modified according to luminance information and chromatic range.

If downsampling (block 110) was not performed during compression, the interpolation (block 156) and the chromatic bleeding artifact reduction (block 158) may be skipped during image reconstruction.

The reconstructed luminance and chrominance (YCbCr) channels may then be displayed (block 160). Prior to display, the reconstructed luminance and chrominance (YCbCr) channels may be converted to RGB color space or some other color space at the original resolution.

Figure 3:
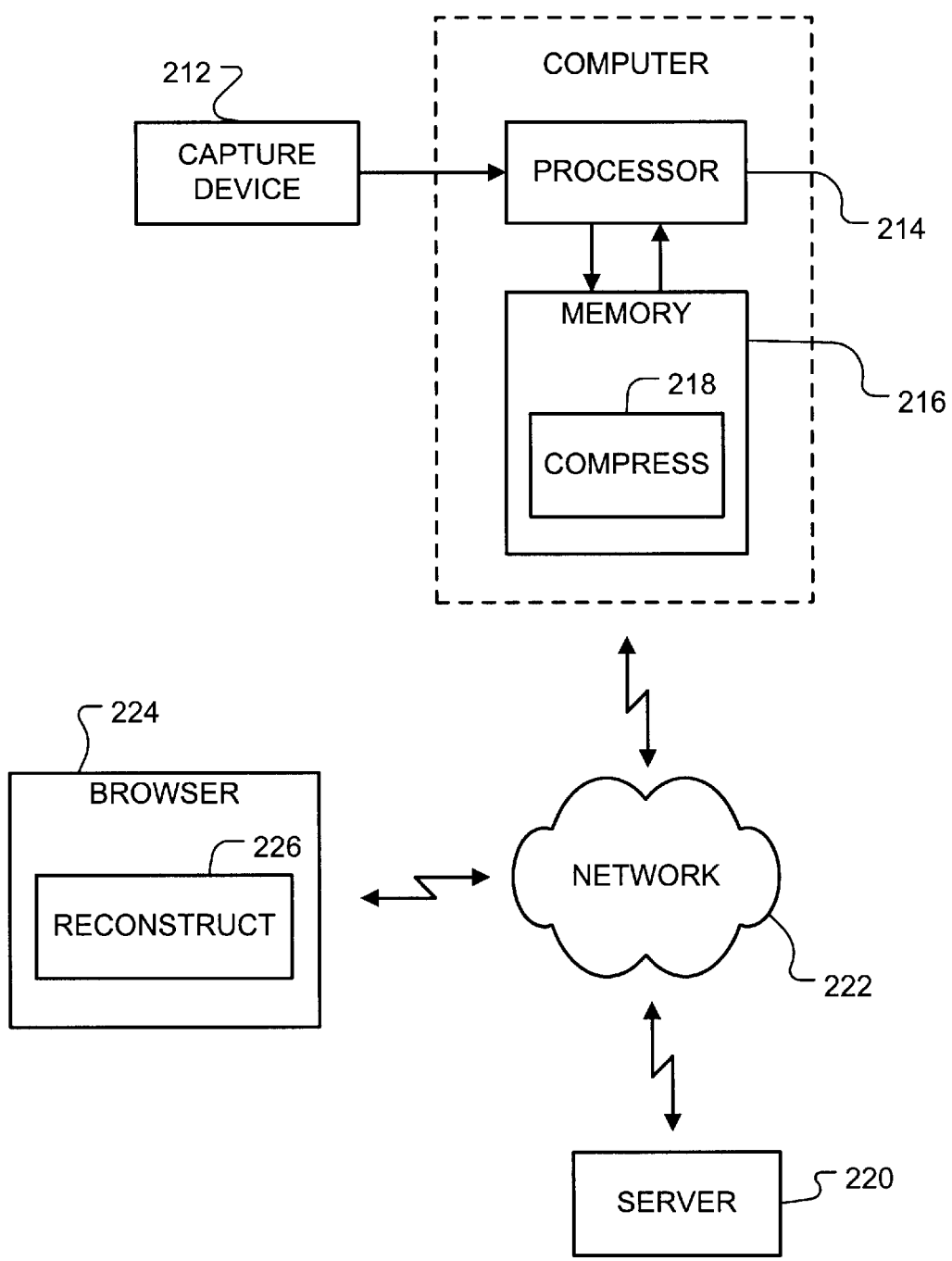
FIG. 3 is an illustration of a system in accordance with the present invention.

Reference is made to FIG. 3, which shows a system in accordance with the present invention. The digital image may be generated by a capture device 212 (e.g., a scanner). The capture device 212 produces a digital image, usually in RGB color space.

A processor 214 stores the digital image in memory 216. The memory 216 also stores a program 218 that, when executed, instructs the processor 214 to compress the digital image. The digital image may be compressed according to the method shown in FIG. 2. The processor 214 and memory 216 may be part of a personal computer or workstation.

The file resulting from the compression may be uploaded to a server 220 via a network 222 (e.g., the Internet). A web browser 224 may download the file from the server 220. The web browser utilizes a program 226 for reconstructing the digital image from the downloaded file. The digital image may be reconstructed according to the method shown in FIG. 2.

The compression and decompression have been described in connection with standard engines (e.g., JPEG, JBIG). However, the compression and decompression engines are not so-limited. Non-standard compression and decompression engines may be used. However, use of standard compression and decompression engines allow for performance upgrades as new lossy and lossless compression standards emerge.

The compression and decompression have been described in connection with decomposing a digital image into visually significant channels (e.g., luminance and red and blue chrominance channels) and applying different compression algorithms to the luminance and chrominance channels. However, the compression and decompression are not limited to Cr and Cb chrominance channels. For example, the digital image may be decomposed into Yuv, Luv or Lab color space (where L represents luminosity).

Due to properties of the human visual system, it is more important to maintain high spatial accuracy of the luminance channel, while spatial accuracy of the chrominance channels may be compromised. On the other hand, dynamic accuracy (i.e., the number of significant bits) is more important for the chrominance channels than for the luminance channel.

The present invention is not limited to the specific embodiments described and illustrated above. Instead, the present invention is construed according to the claims that follow.

What is claimed is:

1. A method of compressing a digital image, the method comprising:

truncating bit depth of a luminance channel of the digital image and performing lossless compression on the truncated luminance channel; and performing lossy compression on chrominance channels of the digital image;

wherein the bit truncation and lossless compression cause a loss of dynamic accuracy but not spatial accuracy in the luminance channel; and wherein the lossy compression causes a loss of spatial accuracy but not dynamic accuracy in the chrominance channels.

2. The method of claim 1, further comprising downsampling the chrominance channels prior to lossy compression.

3. The method of claim 1, further comprising performing bleed-through removal on the digital image prior to compressing the luminance and chrominance channels.

4. The method of claim 1, wherein the lossless compression is performed at a variable bit rate.

5. A method of compressing a digital image, the method comprising:
    truncating bit depth of a luminance channel of the digital image and performing lossless compression on the truncated luminance channel; and
    performing lossy compression on chrominance channels of the digital image;
    wherein the bit depth of the luminance channel is truncated to between five and seven bits.

6. A method of compressing a digital image, the method comprising:
    performing denoising and sharpening of the luminance channel;
    truncating bit depth of the denoised and sharpened luminance channel;
    performing lossless compression on the truncated luminance channel; and
    performing lossy compression on chrominance channels of the digital image.

7. The method of claim 6, wherein the sharpening is performed by variable contrast stretching.

8. A method of compressing a digital image, the method comprising:
    truncating bit depth of a luminance channel of the digital image and performing lossless compression on the truncated luminance channel, the lossless compression producing a first compressed data stream;
    performing lossy compression on chrominance channels of the digital image, the lossy compression producing second and third compressed data streams; and
    combining the first, second and third streams into a single file.

9. A method of reconstructing a digital image from a file, the method comprising:
    extracting from the file a first stream of compressed bit-depth truncated luminance information and second and third streams of compressed chrominance information;
    using lossless decompression to reconstruct a luminance channel from the first stream;
    using lossy decompression to reconstruct chrominance channels from the second and third streams; and
    processing the reconstructed chrominance channels to reduce chromatic bleeding artifacts if the chrominance information was downsampled during compression.

10. The method of claim 7, wherein the chromatic bleeding artifacts are reduced after reconstruction of the luminance channel; and wherein information from the reconstructed luminance channel is used to reduce the chromatic bleeding artifacts.

11. Apparatus for compressing a digital image, the apparatus comprising a processor for bit-depth truncating a luminance channel of the image and performing lossless compression on the bit-depth truncated channel, and performing lossy compression on chrominance channels of the digital image, the bit truncation and lossless compression causing a loss of dynamic accuracy but not spatial accuracy in the luminance channel, the lossy compression causing a loss of spatial accuracy but not dynamic accuracy in the chrominance channels.

12. The apparatus of claim 11, wherein the processor downsamples the chrominance channels prior to lossy compression.

13. The apparatus of claim 11, wherein the processor performs bleed-through removal on the digital image prior to performing compression.

14. The apparatus of claim 11, wherein the lossless compression is performed at a variable bit rate.

15. Apparatus for compressing a digital image, the apparatus comprising a processor for bit-depth truncating raw values in a luminance channel of the image and performing lossless compression on the bit-depth truncated channel, the bit depth of the luminance channel truncated to between five and seven bits.

16. Apparatus for compressing a digital image, the apparatus comprising a processor for performing denoising and sharpening of a luminance channel of the digital image, bit-depth truncating the denoised and sharpened luminance channel, and performing lossless compression on the bit-depth truncated luminance channel.

17. The apparatus of claim 16, wherein the sharpening is performed by variable contrast stretching.

18. Apparatus for reconstructing an image from a file, the apparatus comprising a processor for extracting a first stream of compressed bit-depth truncated luminance information and second and third streams of compressed chrominance information from the file; using lossless decompression to reconstruct a luminance channel from the first stream; using lossy decompression to reconstruct chrominance channels from the second and third streams; and processing the reconstructed chrominance channels to reduce chromatic bleeding artifacts if the chrominance information was downsampled during compression.

19. The apparatus of claim 18, wherein the processor reduces the chromatic bleeding artifacts after reconstruction of the luminance channel; and wherein the processor uses information from the reconstructed luminance channel to reduce the chromatic bleeding artifacts.

20. An article for a processor, the article comprising computer memory; and a program stored in the memory, the program, when executed, causing the processor to perform at least one of:
    image compression by bit-depth truncating a luminance channel of a digital image and compressing the bit-depth truncated luminance channel according to a lossless compression algorithm, and compressing chrominance channels of the digital image according to a lossy compression algorithm, wherein the bit truncation and lossless compression cause a loss of dynamic accuracy but not spatial accuracy in the luminance channel; and wherein the lossy compression causes a loss of spatial accuracy but not dynamic accuracy in the chrominance channels; and
    image reconstruction by extracting a first stream of bit-depth truncated compressed luminance information and second and third streams of compressed chrominance information; using lossless decompression to reconstruct a luminance channel from the first stream; using lossy decompression to reconstruct chrominance channels from the second and third streams; and processing the reconstructed chrominance channels to reduce chromatic bleeding artifacts if the chrominance information was downsampled during compression.

21. The article of claim 20, wherein the lossless compression is performed at a variable bit rate.

22. The article of claim 20, wherein the bit depth of the luminance channel is truncated to between five and seven bits.

23. The article of claim 20, wherein the program further causes the processor to perform denoising and sharpening of the luminance channel prior to truncating the bit depth.

24. The article of claim 23, wherein the sharpening includes variable contrast stretching.

25. The article of claim 20, wherein the lossless compression produces a first compressed data stream and the lossy compression produces second and third compressed data streams, and wherein the program further causes the processor to combine the first, second and third streams into a single file.

26. The article of claim 20, wherein the program further causes the processor to perform bleed-through removal on the digital image prior to compressing the luminance and chrominance channels.

27. The article of claim 20, wherein the chromatic bleeding artifacts are reduced after reconstruction of the luminance channel; and wherein information from the reconstructed luminance channel is used to reduce the chromatic bleeding artifacts.

* * * * *